United States Patent
Tobin

(10) Patent No.: US 9,648,014 B2
(45) Date of Patent: May 9, 2017

(54) METHODS AND APPARATUS FOR NON-CONTACT RADIO FREQUENCY DETECTION AND AUTOMATIC ESTABLISHMENT OF CORRESPONDING COMMUNICATION CHANNEL

(71) Applicant: Christopher Tobin, McLean, VA (US)

(72) Inventor: Christopher Tobin, McLean, VA (US)

( * ) Notice: Subject to any disclaimer, the term of this patent is extended or adjusted under 35 U.S.C. 154(b) by 315 days.

(21) Appl. No.: 14/216,149

(22) Filed: Mar. 17, 2014

(65) Prior Publication Data

US 2014/0289823 A1 Sep. 25, 2014

Related U.S. Application Data

(60) Provisional application No. 61/799,891, filed on Mar. 15, 2013.

(51) Int. Cl.
| | |
|---|---|
| *G06F 21/00* | (2013.01) |
| *H04L 29/06* | (2006.01) |
| *H04W 12/06* | (2009.01) |
| *G06F 21/32* | (2013.01) |
| *G06F 21/35* | (2013.01) |
| *G06F 21/44* | (2013.01) |
| *H04W 4/00* | (2009.01) |
| *H04W 84/12* | (2009.01) |

(52) U.S. Cl.
CPC .......... *H04L 63/0853* (2013.01); *G06F 21/32* (2013.01); *G06F 21/35* (2013.01); *G06F 21/44* (2013.01); *H04L 63/18* (2013.01); *H04W 12/06* (2013.01); *H04W 4/008* (2013.01); *H04W 84/12* (2013.01)

(58) Field of Classification Search
CPC ........................ H04L 63/0807; H04L 63/0823
USPC ........................................................... 726/5
See application file for complete search history.

(56) References Cited

U.S. PATENT DOCUMENTS

| | | | |
|---|---|---|---|
| 2008/0120711 A1* | 5/2008 | Dispensa | H04L 63/0869 726/7 |
| 2013/0036456 A1* | 2/2013 | Boysen | G06Q 20/04 726/4 |

* cited by examiner

*Primary Examiner* — Anthony Brown

(57) ABSTRACT

Methods and apparatus for establishing secure communications are disclosed. An identifier is received from a personal object such as a ring. This identifier is received, for example, through a non-contact near field communication. The identifier is recognized and associated to a mobile terminal device of a user, the mobile terminal device being separate from the object. Then, a secure communication channel is established with the mobile terminal device over another connection that preferably provides a secure communication channel.

20 Claims, 6 Drawing Sheets

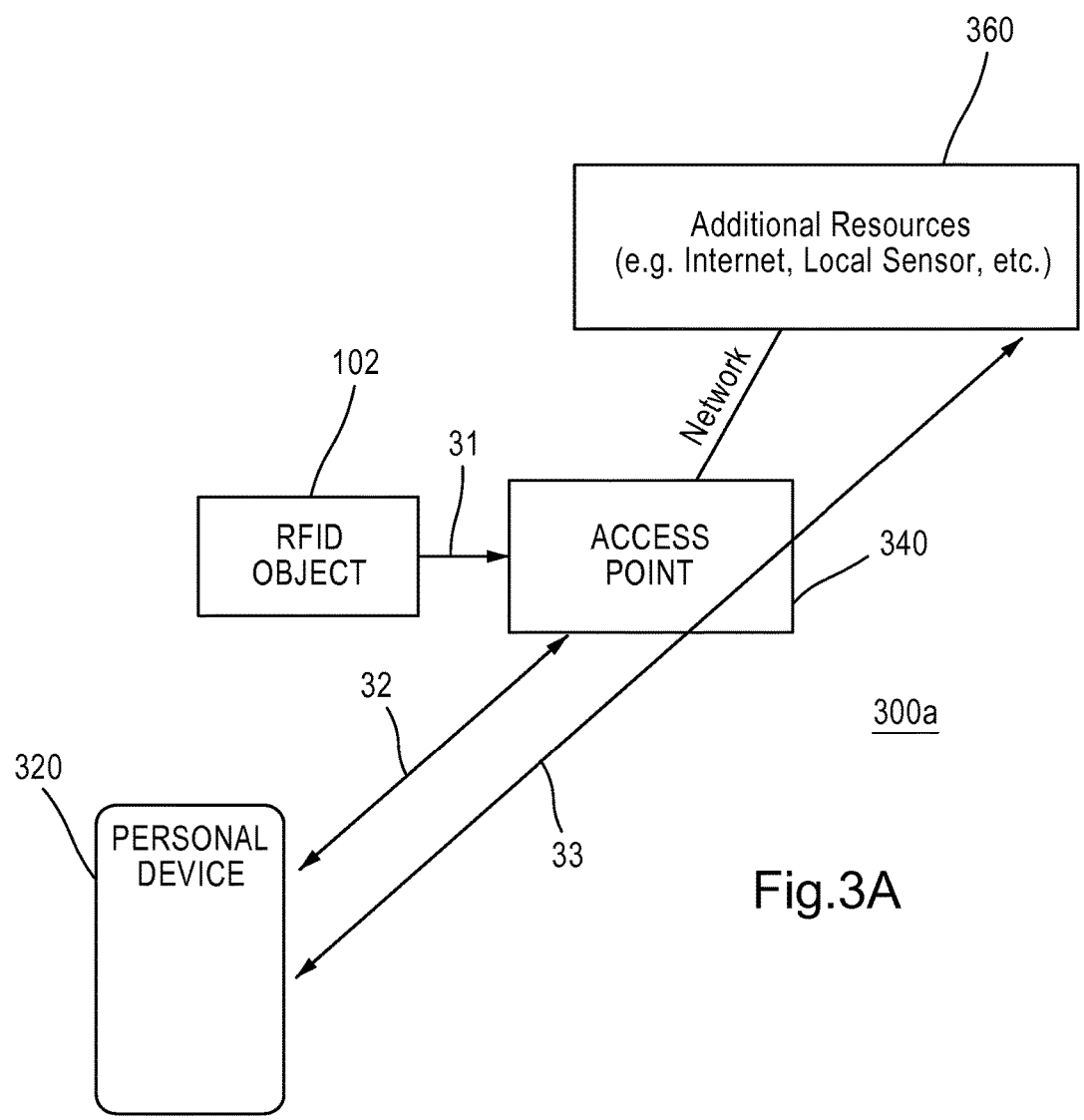

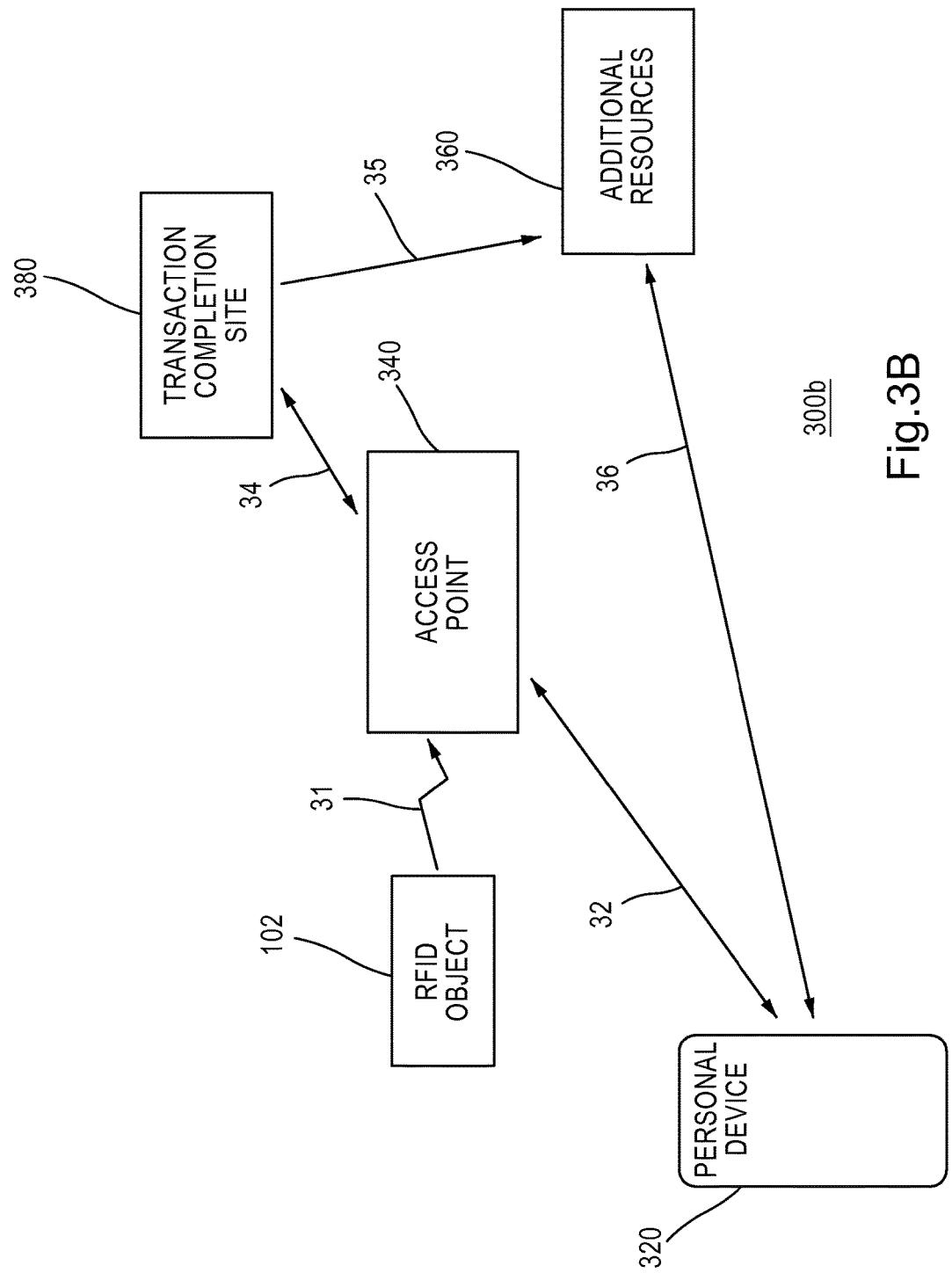

METHODS AND APPARATUS FOR NON-CONTACT RADIO FREQUENCY DETECTION AND AUTOMATIC ESTABLISHMENT OF CORRESPONDING COMMUNICATION CHANNEL

CROSS REFERENCE TO RELATED APPLICATIONS

This application claims priority to provisional application Ser. No. 61/799,891, filed on Mar. 15, 2013, the entire contents of which are hereby incorporated by reference.

BACKGROUND OF THE INVENTION

This disclosure relates generally to establishing secure communication channels and more particularly to methods and apparatus for non-contact radio frequency detection and automatic establishment of a corresponding communication channel.

SUMMARY OF THE INVENTION

Methods and apparatus for establishing secure communications are disclosed. An identifier is received from a personal object such as a ring. This identifier is received, for example, through a non-contact near field communication. The identifier is recognized and associated to a mobile terminal device of a user, the mobile terminal device being separate from the object. Then, a secure communication channel is established with the mobile terminal device over another connection that preferably provides a secure communication channel. The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 3A is a block and event diagram that illustrates another example of a system and method for initiating a secure separate communication channel, with additional communications with devices and additional resources external to an immediate area.

FIG. 3B is a block and event diagram that illustrates another example of a system and method for initiating a secure separate communication channel.

DETAILED DESCRIPTION OF THE INVENTION

Figure 1:
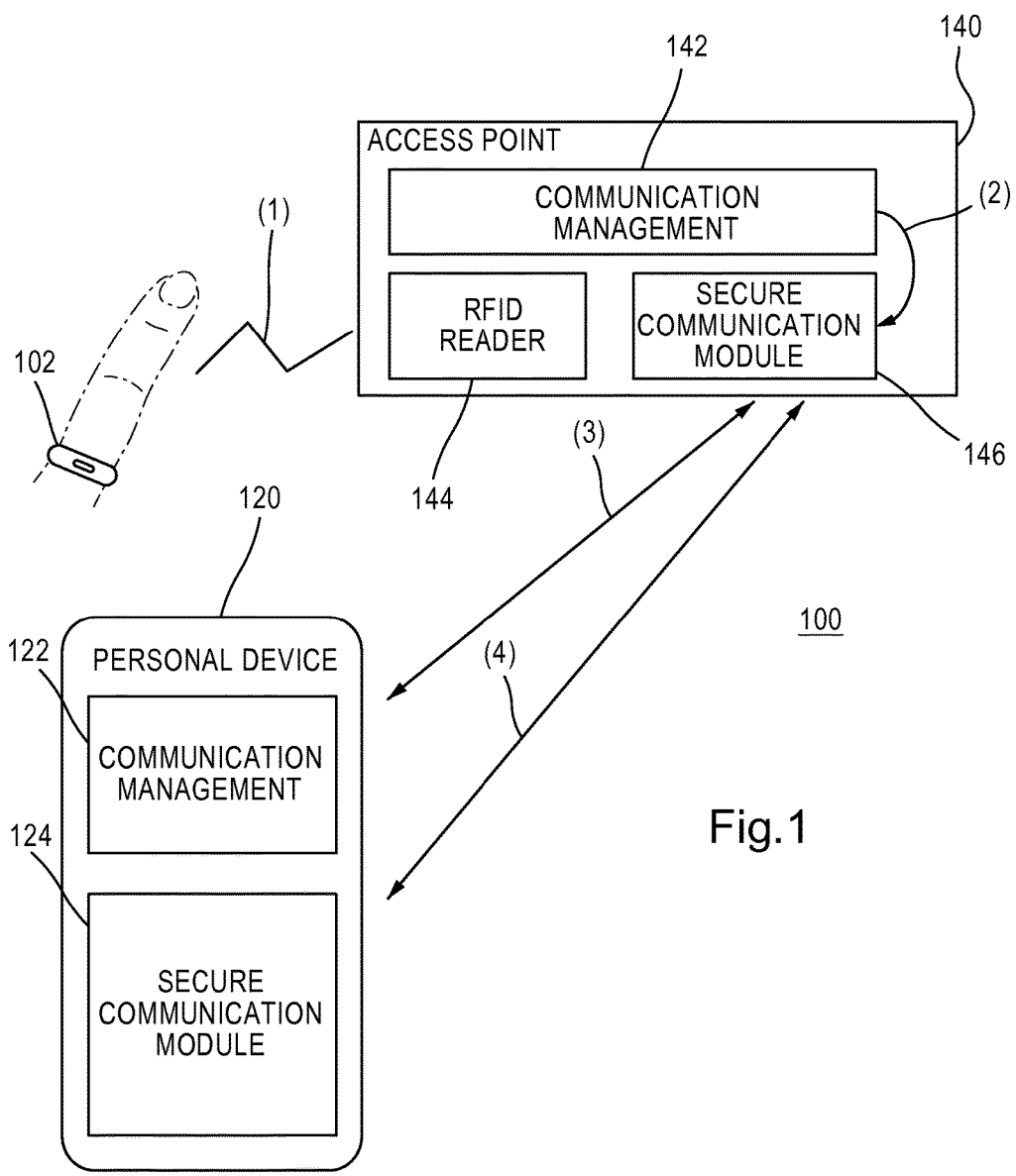
FIG. 1 is a block and event diagram illustrating a system and method wherein an object that is separate from a corresponding personal device is used for automatic recognition and initiation of a secure separate communication channel.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Many personal devices such as smartphones may be equipped with an RFID. For example, a Smartphone may be placed in proximity to Point of Sale (POS) terminal and the RFID is recognized. This is done through Near Field Communication (NFC), a very simple way to communicate the RFID without using much or any battery. Once the RFID is recognized, more rich communications may occur between the smartphone and the POS. The rich communication capabilities are preferred because the corresponding transaction may entail credit card and other information etc. They may also require more communication capability or bandwidth than the first communication channel (for RFID) can handle.

However, carrying the personal device around and getting it out of one's pocket or purse, etc., to make a payment can be a hassle. Additionally, exposing the personal device may present a theft or other security issue.

According to this description, an article having the RFID and the personal device with rich communications are separated. Preferably, the RFID object is an article that is easy to wear or carry, such as a wrist band, a ring, a watch, a key chain, or any typically inanimate object one might carry, wear or have on one's person.

Although they are separated, the RFID-article and the personal device are not completely disassociated from each other. Instead, they are paired according to a pairing scheme, which allows the RFID to be associated with the personal device.

When the RFID-article is placed in proximity with the POS terminal, the RFID is recognized, and this prompts a separate communication channel between the POS terminal and the personal device, which may remain concealed. Preferably, the separate communication channel is one with a range greater than that provided by NFC, such as WIFI or Bluetooth. This means that the personal device would need to be in general proximity with the POS terminal according to whatever the range of the separate communication channel would be, but would not need to be placed within the closer proximity of the RFID as required according to the technology used for the initial identification (e.g., NFC).

The POS terminal is just one example of a services access point, secure access to which is described herein. For example, the access point may be an entry location of a public transportation system (e.g., subway). Here, the entry location may include a turnstile or other similar location having a pad that is used to recognize users entering the system. In this example, the RFID-object may be placed in proximity in the pad to prompt the sequence that accommodates separate, preferably secure communications with the personal device.

FIG. 1 illustrates an example of a system 100 wherein an object 102 such as an RFID-object (e.g., a ring with an RFID tag) that is separate from a corresponding personal device 120 (e.g., a smart phone) may be used for automatic recognition and initiation of a secure separate communication channel. An Access Point 140 (e.g., a POS terminal) includes a communication management module 142 as well as an RFID reader module 144 for RFID read capability, as well as a secure communication module 146. The communication management module 142 includes program code that is used to carry out management of the recognition protocol. The secure communication module 146 is used to establish and carry out secure communications with devices such as the personal device 120. This may be via various wireless communication options such as Bluetooth, WIFI, WLAN, etc.

The Access Point 140 may be a computing device with a processor and memory, with the memory storing program code executable by the processor to carry out the functions described herein, including but not limited to those provided by the communication management module 142, RFID reader 144, and secure communication module 146.

The personal device 120 is similarly a computing device with a processor and a memory, and the memory storing program code executable by the processor to perform the operations described herein. In this example, the personal device 120 includes a communication management module 122 and secure communication module 124. The communication management module 122 includes information that allows the recognition and initiation of secure communications to occur, and the secure communication module 124 is used to establish and carry out secure communications with devices such as other personal devices (or the Access Point 140).

The process initiates with the user placing the RFID object 102 within proximity of the RFID reader 144 (step (1)). The Access Point 140 thus recognizes the RFID unique to the object 102 and prompts a communication to query for the corresponding personal device 120 (Step (2)). The Access Point 140 sends a query to establish communication with the personal device 120 (Step (3)). Finally, the separate communication channel between the personal device and the Access Point is established and further bidirectional communications may be made (Step (4)).

The communications in the second channel between the personal device 120 and the Access Point 140 are preferably secure. One way of doing this is storing a passcode in the personal device. In one example, the passcode may match the RFID of the RFID object. Thus, in response to the query (Step (3)), the personal device may return the identifier corresponding to the RFID (separately from the RFID object) in order to authorize the Access Point 140 to complete the establishment of the secure communication channel.

The secure communications channel may also be configured to include encrypted communications between the personal device and the access point, so that private and/or sensitive information of the user may be sent to and through the Access Point 140 without compromising its disclosure to others.

Figure 2:
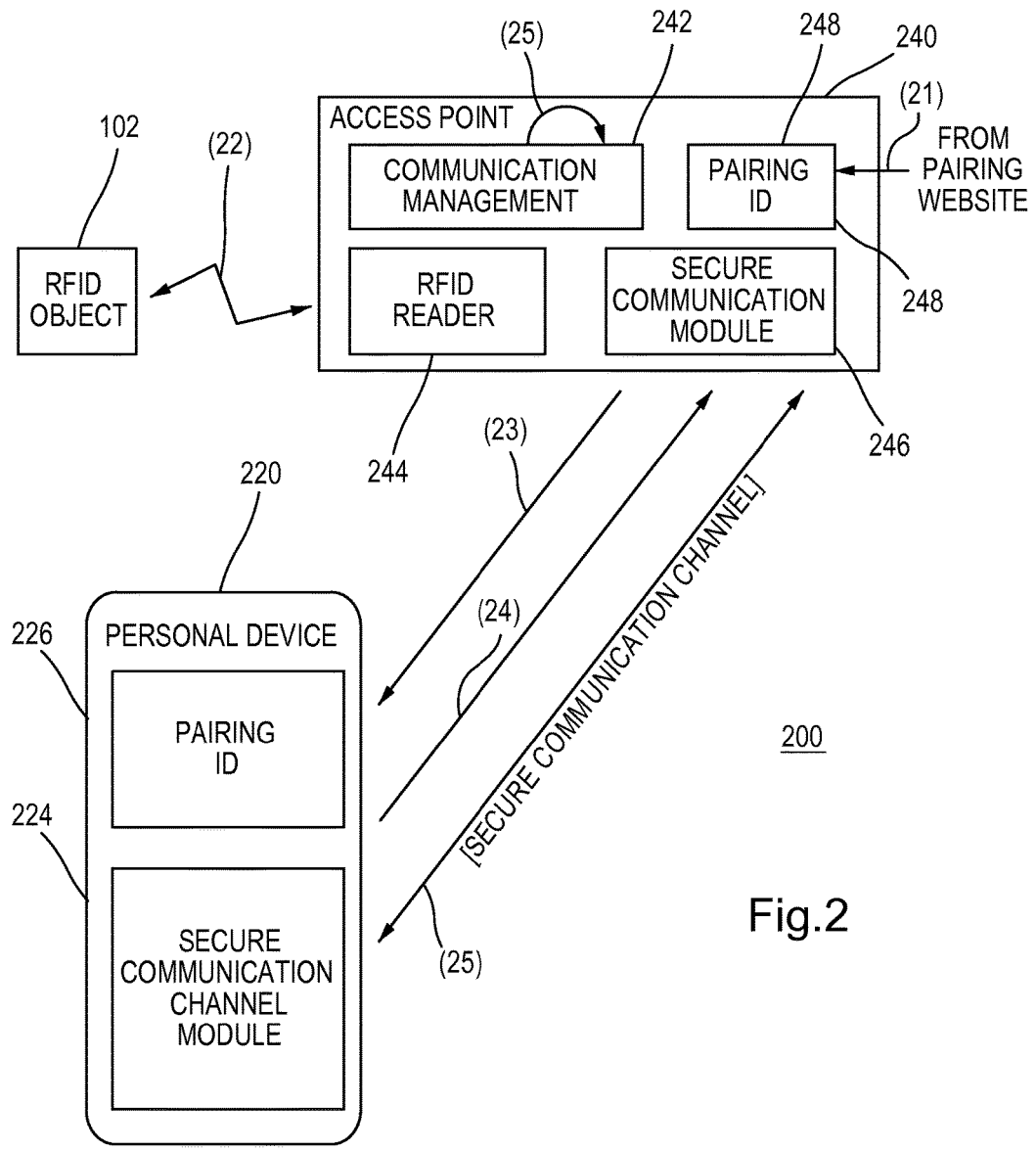
FIG. 2 is a block and event diagram that illustrates another example of a system and method for initiating a secure separate communication channel with a pairing scheme.

FIG. 2 illustrates another example of a system 200, and further illustrates how a pairing scheme is implemented to accommodate automatic recognition and initiation of separate secure communication.

The Access Point 240 includes a communication management module 242, an RFID reader 244, a secure communication module 246 and a pairing ID module 248. The personal device 220 includes the secure communication module 224 and a pairing ID module 226.

In this example, the RFID object 102 and the personal device 220 are paired together. This would typically occur prior to usage of the object 102 and device 220 to initiate the establishment of a secure communication channel. For example, the user may conduct a pairing of the RFID object 102 and the personal device 220 at home. This may be done using a website that manages the pairing process. When the pairing is made, a PAIR ID is generated that associates the personal device 220 to the RFID object 102. The RFID object 102 only has its identifier (RFID) and does not necessarily have the PAIR ID. The PAIR ID may be securely stored on the personal device 220 in the pairing ID module 226. The personal device 220 does not necessarily have the RFID stored therein.

As part of the pairing scheme, the website associates the pairing (RFID, PAIR ID) and can pass this information to the Access Point 240 (Step (21)), such as through Internet communications, a private network, or the like. The pairing information may be stored in the Pairing ID module 248 as illustrated.

In this example, the user similarly places the RFID object 102 within sufficient proximity of the Access Point 240, and it is read by the RFID Reader (Step (22)). The communication module 246 receives the RFID and can retrieve the pairing information from the Pairing ID module 248. The communication management module 242 then prompts the secure communication module 246 to initiate a query to the personal device 220 (Step (23)). In response to this, the personal device responds by transmitting the PAIR ID to the Access Point 240 (Step (24)). The secure communications module 246 receives this information, and the communication management module 246 may then determine whether there is a legitimate pairing of RFID to PAIR ID by accessing the pairing information. If so, the secure communication channel is authorized between the Access Point 240 and the personal device 220. Thereafter, communications to and through the Access Point may be made by the personal device. (Step (25).

It should be understood that once the second communication channel is established (25), a variety of communications may then be made. In the example introduced above, the personal device user may simply be making a purchase and may complete the transaction once the communication channel is available as described herein. The communications over this channel may be encrypted for security.

FIG. 3A shows still another example of a system 300*a*, further illustrating that establishing the connection with the personal device 320 through the Access Point 340 may be used to further additional communications with devices and additional resources 360 external to the immediate area. Here, the RFID is recognized (Step (31)) then the secure communication channel is authorized and made (Step (32)) and then additional communications may be made between the personal device and devices hosting the additional resources (Step (33)).

In this example, once the secure communications channel is arranged, financial information and other secure information of the personal device user may be transmitted from the personal device through the secure communication channel to the additional resources 360 in order to complete a purchasing transaction. Thus, for example, the Access Point 340 may be a point of sale terminal. When making a purchase, the user places the object 102 in proximity to the access point, and then upon confirmation and establishment of the secure communications channel, payment information is provided over the secure communications channel to complete the transaction.

FIG. 3B shows another example of a system 300*b* wherein the secure communications channel is established with a transaction completion site 380 from the access point 240, and wherein the additional resources 360 are separately accessible by the personal device 320.

Here, the RFID object 102 has the identifier that is initially recognized by the access point 340 (Step (31)). Then, the personal device 320 is queried by the access point 340 to ensure that is in the location (Step (32)). This can be done using the various options described above. After confirmation, the access point 340 engages in a secure communication with a transaction completion site 380 (Step (34)). This may be performed in connection with a purchase transaction being made by the user, such as in a retail location with the Access Point being a POS terminal. However, in lieu of having the personal device 320 carry and send the sensitive financial information to complete the purchase, the access point 340 uses the identification scheme (RFID object plus presence of personal device) to initiate the transaction, and then engages in follow up communications with the transaction completion site 380 directly, preferably using encrypted communications over the secure communications channel. Additionally, the transaction completion site 380 may be appraised of the identification of the user account corresponding to the identifier in the RFID object 102.

In connection with completing the transaction, the presence of the user in the particular location may prompt the provision of additional locally applicable resources 360 to the user, via still another communication channel (36).

The system may also operate collectively for several personal device users, wherein several users "login" by placing their RFID object near the RFID reader, which may then allow the users to communicate with every other person in the group of users who has similarly logged in. For example, WIFI communications involving each of the users may be made following the automatic recognition, with each other and/or with the Access Point.

A variety of other applications will be apparent and this description is not limited to the specific applications named herein. For example, one application may be useful for runners, wherein they may make use of recognition via the ring or other object at milestone posts in lieu of having to have their personal device in hand. These and other embodiments are contemplated.

Accordingly, this description includes methods, apparatuses and computer program products for recognizing an RFID and then automatically authorizing and establishing a separate secure communication channel with a corresponding separate personal device.

Figure 4:
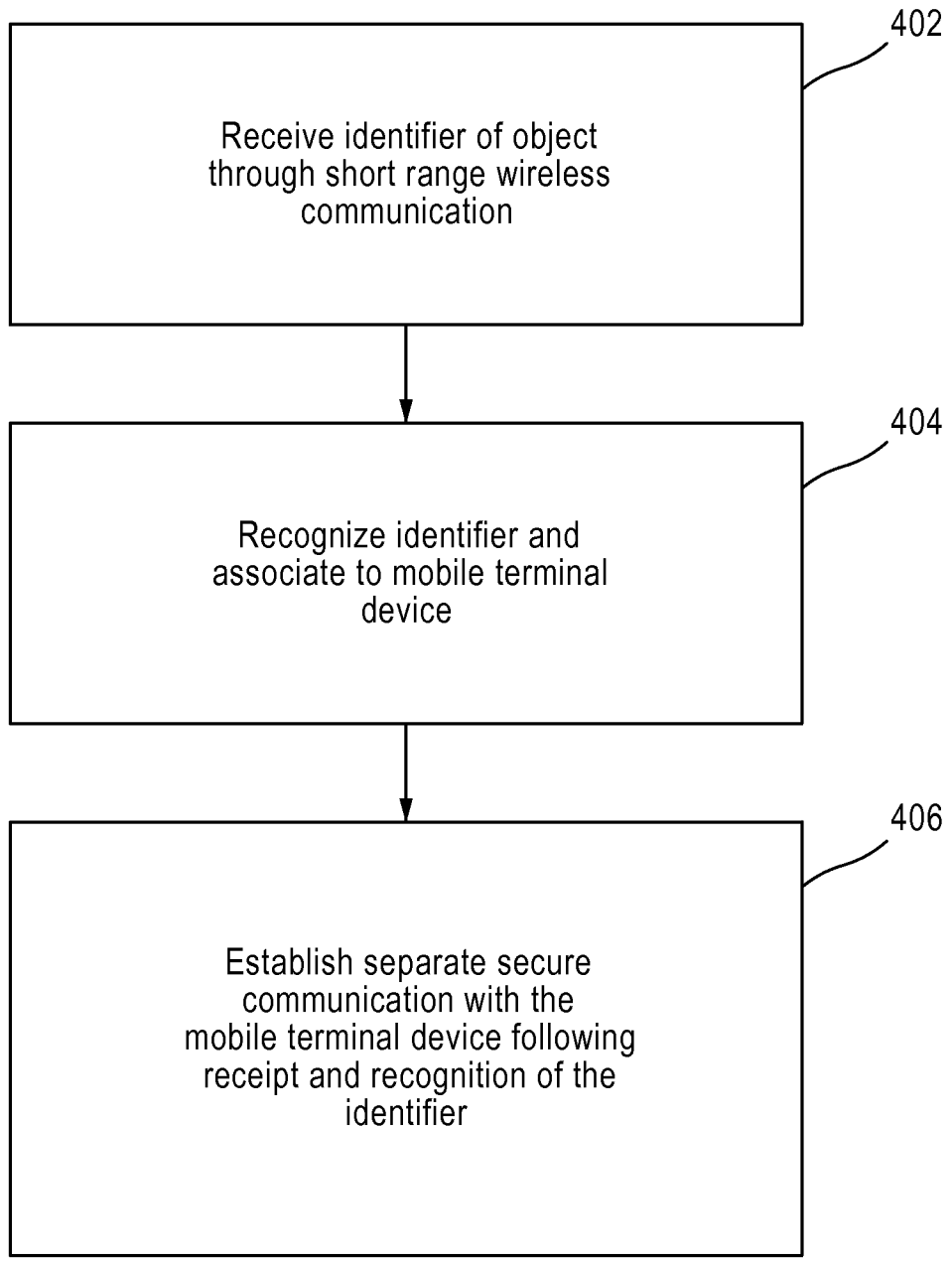
FIG. 4 is a flow diagram illustrating an example of a method for establishing a secure communication channel.

FIG. 4 is a flow diagram illustrating an example of a process 400 for establishing a secure communications channel, such as in a situation where a user is making a purchase transaction at a point of sale terminal.

When an RFID object is brought into proximity of an RFID reader, the corresponding identifier is received 402 through a short range wireless communication. This identifier is recognized 404 and associated to a corresponding mobile terminal device, such as a smart phone that the user may have in her pocket at the time.

Following receipt and recognition of the identifier, a separate secure communication channel is then established 406 with the mobile terminal device. This separate secure communication channel may be encrypted and may be used for the transmission of sensitive data to and from the mobile terminal device, including but not limited to personal information and financial information for the purchase transaction. The separate secure communication channel may use various communication technologies including but not limited to WiFi, wireless network, or Bluetooth communications.

Figure 5:
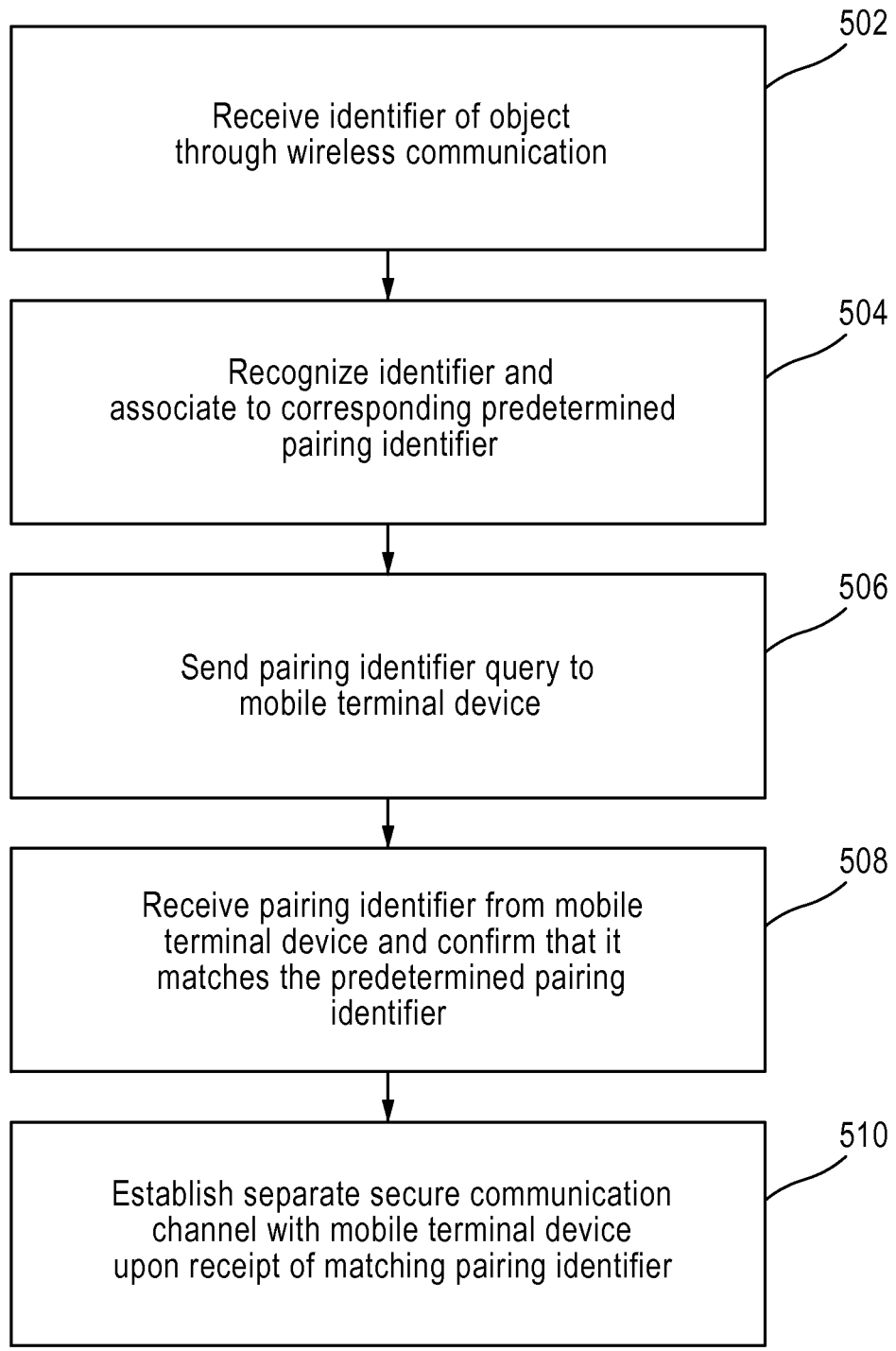
FIG. 5 is a flow diagram illustrating another example of a method for establishing a secure communication channel.

FIG. 5 is a flow chart illustrating another example of a process for establishing a secure communication channel, which uses a pairing ID as part of the confirmation process.

Here, the RFID object is again brought into proximity of the POS terminal or other access point device, and the identifier corresponding to the object is thereby received 502. Again, the identifier is preferably a unique identifier corresponding to the object, and it is thereby recognized. Additionally, a predetermined pairing identifier is associated to the object identifier. The association of the predetermined pairing identifier, the object, and the user's mobile terminal device may have been made well before the purchasing transaction event. For example, the user may engage in a home set up wherein the user pairs the object to the mobile terminal device (phone). Alternatively, the same association may be made at a retail location of the like.

The association of the object identifier and the predetermined pairing identifier may be passed to merchants or other participants in a scheme wherein the object is used to initiate secure communication channels. Thus, the POS terminal will store or have access to the predetermined pairing identifier. The mobile terminal device also stores the predetermined pairing identifier as a result of the pairing process, preferably in a secure memory location.

Upon recognition of the object identifier, the POS terminal sends 506 a pairing identifier query to the mobile terminal device. The query simply asks for the identifier, without the POS terminal revealing its copy of the number. In response to this, the mobile terminal device sends its copy of the predetermined pairing identifier (e.g., number) to the POS terminal. The POS terminal can then confirm a matching condition for the predetermined pairing identifier (508).

After confirmation that the mobile terminal device has the matching pairing identifier, the separate secure communication channel is established 510 with the mobile terminal device.

Thus embodiments of the present invention produce and provide non-contact radio frequency detection and automatic establishment of a corresponding communication channel. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for establishing secure communications with a mobile terminal device at a location of a services access point, the method comprising:
   receiving, at the services access point, a unique identifier of a user-wearable object over a first wireless connection, the first wireless connection comprising a short range wireless communication channel between the user-wearable object and the services access point;
   recognizing the unique identifier and associating the unique identifier to the mobile terminal device, the mobile terminal device being separate from the user-wearable object; and
   establishing a secure communication channel with the mobile terminal device over a second wireless connection, the second wireless connection being between the services access point and the mobile terminal device in association with receiving the unique identifier, the second wireless connection being at the location of the services access point but being distinct from the first wireless connection.

2. The method according to claim 1, wherein the short range wireless communication channel comprises a near field communication.

3. The method according to claim 1, wherein the second wireless connections comprises a wireless network communication.

4. The method according to claim 1, further comprising:
sending a query to the mobile terminal device after receiving the unique identifier over the first wireless connection; and
receiving a passcode from the mobile terminal device in response to the query, and establishing the secure communication channel with the mobile terminal device upon receiving the passcode.

5. The method according to claim 1, further comprising:
associating the unique identifier of the user-wearable object to a predetermined pairing identifier;
sending a pairing identifier query to the mobile terminal device; and
establishing the secure communication channel only when the mobile terminal device returns the predetermined pairing identifier in response to the pairing identifier query.

6. A non-transitory computer readable medium storing program code for establishing secure communications with a mobile terminal device at a location of a services access point, program code being executable by a processor to perform operations comprising:
receiving, at the services access point, a unique identifier of a user-wearable object over a first wireless connection, the first wireless connection comprising a short range wireless communication channel between the user-wearable object and the services access point;
recognizing the unique identifier and associating the unique identifier to the mobile terminal device, the mobile terminal device being separate from the user-wearable object; and
establishing a secure communication channel with the mobile terminal device over a second wireless connection, the second wireless connection being between the services access point and the mobile terminal device in association with receiving the unique identifier, the second wireless connection being at the location of the services access point but being distinct from the first wireless connection.

7. The computer readable medium according to claim 6, wherein the short range wireless communication channel comprises a near field communication.

8. The computer readable medium according to claim 6, wherein the second connections comprises a wireless network communication.

9. The computer readable medium according to claim 6, wherein the operations further comprise:
sending a query to the mobile terminal device after receiving the unique identifier over the first wireless connection; and
receiving a passcode from the mobile terminal device in response to the query, and establishing the secure communication channel with the mobile terminal device upon receiving the passcode.

10. The computer readable medium according to claim 6, wherein the operations further comprise:
associating the unique identifier of the user-wearable object to a predetermined pairing identifier;
sending a pairing identifier query to the mobile terminal device; and
establishing the secure communication channel only when the mobile terminal device returns the predetermined pairing identifier in response to the pairing identifier query.

11. An apparatus for establishing secure communications with a mobile terminal device at a location of a services access point, apparatus comprising:
a processor; and
a memory, the memory storing program code executable by the processor to perform operations comprising:
receiving, at the services access point, a unique identifier of a user-wearable object over a first wireless connection, the first wireless connection comprising a short range wireless communication channel between the user-wearable object and the services access point;
recognizing the unique identifier and associating the unique identifier to the mobile terminal device, the mobile terminal device being separate from the user-wearable object; and
establishing a secure communication channel with the mobile terminal device over a second wireless connection, the second wireless connection being between the services access point and the mobile terminal device in association with receiving the unique identifier, the second wireless connection being at the location of the services access point but being distinct from the first wireless connection.

12. The apparatus according to claim 11, wherein the short range wireless communication channel comprises a near field communication.

13. The apparatus according to claim 11, wherein the second wireless connection comprises a wireless network communication.

14. The apparatus according to claim 11, wherein the operations further comprise:
sending a query to the mobile terminal device after receiving the unique identifier over the first wireless connection; and
receiving a passcode from the mobile terminal device in response to the query, and establishing the secure communication channel with the mobile terminal device upon receiving the passcode.

15. The apparatus according to claim 11, further comprising:
associating the unique identifier from the user-wearable object to a predetermined pairing identifier;
sending a pairing identifier query to the mobile terminal device; and
establishing the secure communication channel only when the mobile terminal device returns the predetermined pairing identifier in response to the pairing identifier query.

16. The method according to claim 1, wherein the services access point comprises a point of sale terminal.

17. The method according to claim 16, wherein financial information for a purchasing transaction is communicated after receiving the identifier, the financial information being communicated with additional resources external to the location of the services access point to complete the purchasing transaction.

18. The method according to claim 1, wherein the user-wearable object comprises one of a ring or a watch.

19. The computer readable medium according to claim 6, wherein the user-wearable object comprises one of a ring or a watch.

20. The apparatus according to claim 11, wherein the user-wearable object comprises one of a ring or a watch.

* * * * *